(12) United States Patent  (10) Patent No.: US 7,457,062 B1
Chang et al.  (45) Date of Patent: Nov. 25, 2008

(54) DRIVING APPARATUS FOR FINE-TUNING FOCUS

(75) Inventors: Tsung-Kai Chang, Hsinchu (TW); Wen-Sheng Tai, Taoyuan (TW); Chin-Sung Liu, Hsinchu (TW); Yi-Jung Chen, Yunlin (TW)

(73) Assignee: TopRay Technologies, Inc., Hsinchu (TW)

( * ) Notice: Subject to any disclaimer, the term of this patent is extended or adjusted under 35 U.S.C. 154(b) by 0 days.

(21) Appl. No.: 12/106,268

(22) Filed: Apr. 19, 2008

(30) Foreign Application Priority Data

Aug. 16, 2007 (TW) .............................. 96213585 U

(51) Int. Cl.
G02B 7/02 (2006.01)

(52) U.S. Cl. ...................................... 359/824; 335/222

(58) Field of Classification Search ................. 359/824; 335/222
See application file for complete search history.

(56) References Cited

U.S. PATENT DOCUMENTS

| 4,646,283 | A | * | 2/1987 | Ito et al. | ..................... 369/256 |
|---|---|---|---|---|---|
| 5,177,640 | A | * | 1/1993 | Grassens | ..................... 359/814 |
| 5,241,528 | A | * | 8/1993 | Mohri et al. | ................. 720/685 |
| RE37,084 | E | * | 3/2001 | Ito et al. | ..................... 369/256 |
| 6,342,978 | B1 | * | 1/2002 | Nishikawa et al. | .......... 359/813 |
| 6,768,601 | B2 | * | 7/2004 | Ju | ............................... 359/824 |
| 7,199,949 | B2 | * | 4/2007 | Haruguchi et al. | .......... 359/814 |
| 2001/0026528 | A1 | * | 10/2001 | Suzuki et al. | ................ 369/244 |
| 2007/0035860 | A1 | * | 2/2007 | Adachi et al. | ................ 359/824 |

* cited by examiner

Primary Examiner—Ramon M Barrera

(57) ABSTRACT

A driving apparatus for fine-tuning focus is provided, including a movable structure suspended inside an outer holder by a suspension set. The suspension set is connected to the movable structure and the outer holder respectively so that the movable structure is suspended inside the outer holder, and can move inside the outer holder. With a magnet force generated by the interaction of the magnetic field of said first magnet set and said second magnet set of said outer holder, and the electrical current in said first coils and said second coils of said movable structure, the magnet force is able to drive the movable structure upward and downward to adjust the focus.

3 Claims, 4 Drawing Sheets

DRIVING APPARATUS FOR FINE-TUNING FOCUS

FIELD OF THE INVENTION

The present invention generally relates to a focus driving apparatus, and more specifically to a driving apparatus for fine-tuning focus, applicable to mobile phones and small digital cameras.

BACKGROUND OF THE INVENTION

The focus driving apparatus supports and carries the lens so that the lens can move in a restricted space for adjusting the focus for clear pictures. As the mobile phones and digital cameras are becoming smaller in size, it is imperative to a focus driving apparatus that can fit in the limited space in these electronic devices. The focus driving apparatus must include an inner holder, an outer holder, an upper metal sheet, and a lower metal sheet. The inner holder is for carrying the lens, and its upper part and the lower part are connected to the upper metal sheet and the lower metal sheet respectively. The outer holder is located on the outside of the inner holder, and is also connected to the upper metal sheet and the lower metal sheet, respectively. Therefore, the inner holder can drive the lens for adjusting the focus.

As the upper metal sheet and the lower metal sheet for holding the inner holder are manufacture in a monolithic structure, the manufacturing process is slow and difficult because of the thinness of the metal sheets. Therefore, the cost of the metal sheets is usually high.

Therefore, it is imperative to develop a low cost and easily manufactured focus driving apparatus that can meet the functional demands of the small electronic devices.

SUMMARY OF THE INVENTION

The present invention has been made to overcome the above-mentioned drawbacks. The primary object of the present invention is to provide a driving apparatus for fine-tuning focus, including an outer holder, a movable structure, and a suspension set. One end of the suspension set is fixed to the movable structure, and the other end of the suspension set is fixed to the outer holder so that the suspension set can support the movable structure within the outer holder.

The outer holder includes an upper holder, a lower holder, an upper case, a lower case, a first printed circuit board (PCB), a second PCB, a first magnet set and a second magnet set. The first and the second PCBs are both on the outside of upper holder and the lower holder, and the first and second magnet sets are both inside the upper holder and the lower holder, and are arranged as a stack.

The movable structure includes an inner holder, a first coil, a second coil, an upper spacer, and a lower spacer. The first and the second coils are arranged as a stack on the outside of the inner holder. The upper spacer and the lower spacer are fixed to the upper and lower position of the inner holder respectively.

The suspension set includes an upper metal wire group and a lower metal wire group. Each metal wire group includes at least three metal wires, and therefore the suspension set includes at least six metal wires.

The present invention utilizes the interaction between the magnetic fields generated by the first magnet set and the second magnet of the outer holder, and the electrical current in the first and the second coils of the movable structure to create the magnetic force for driving the movable structure to move upward and downward so as to fine-tune the focus.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
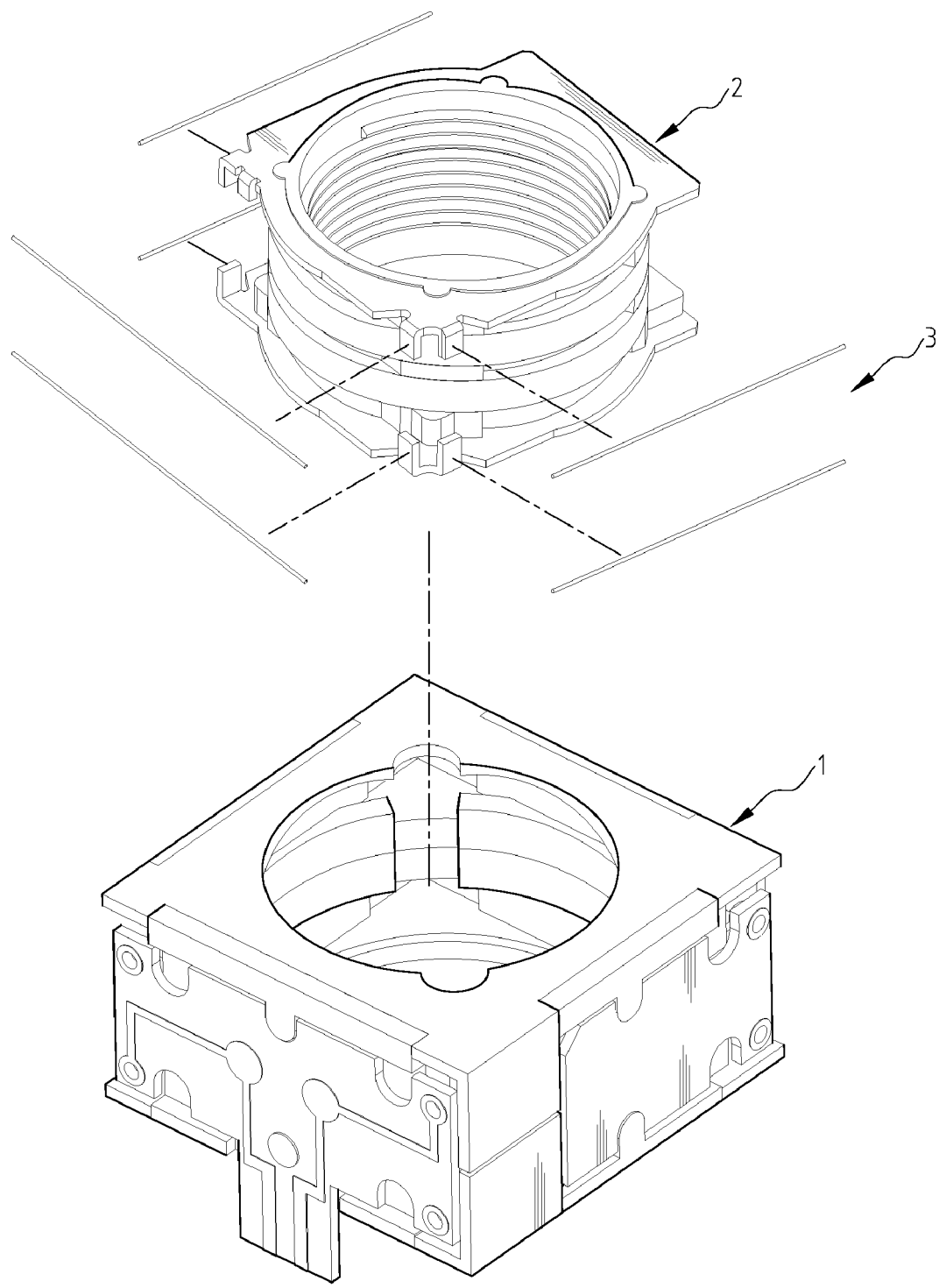
FIG. 1 shows a schematic view of the present invention.

FIG. 1 shows a schematic view of the present invention. A driving apparatus for fine-tuning focus of the present invention includes an outer holder 1, a movable structure 2, and a suspension set 3. One end of suspension set 3 is fixed to movable structure 2, and the other end of suspension set 3 is fixed to outer holder 1 so that suspension set 3 can support movable structure 2 within outer holder 1.

Figure 2:
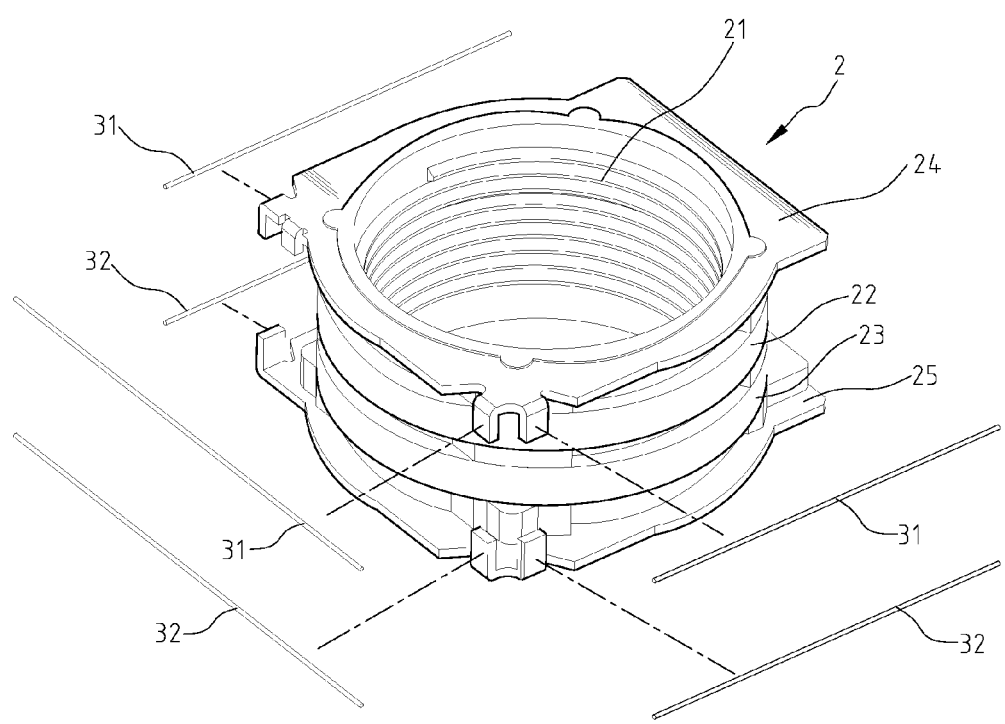
FIG. 2 shows a schematic view of the movable structure and the suspension set of the present invention.

FIG. 2 shows a schematic view of movable structure 2 and suspension set 3 of the present invention. As shown in FIG. 2, movable structure 2 includes an inner holder 21, a first coil 22, a second coil 23, an upper spacer 24, and a lower spacer 25. Inner holder 21 is mainly for holding a lens (not shown). First coil 22 and second coil 23 are arranged as a stack, and attached to the outer wall of inner holder 21. Upper spacer 24 and lower spacer 25 are fixed t the upper and lower positions of inner holder 21, respectively. Upper spacer 24 and lower spacer 25 are where suspension set 3 is fixed to. Suspension set 3 includes at least six metal wires, including a first metal wire group 31 with at least three metal wires, and a second metal wire group 32 with at least three metal wires. One end of first metal wire group 31 is soldered to upper spacer 24, and one end of second metal wire group 32 is soldered to lower spacer. The other end of first metal wire group 31 and the other end of second metal wire group 32 are fixed to outer holder 1, as shown in FIG. 3.

Figure 3:
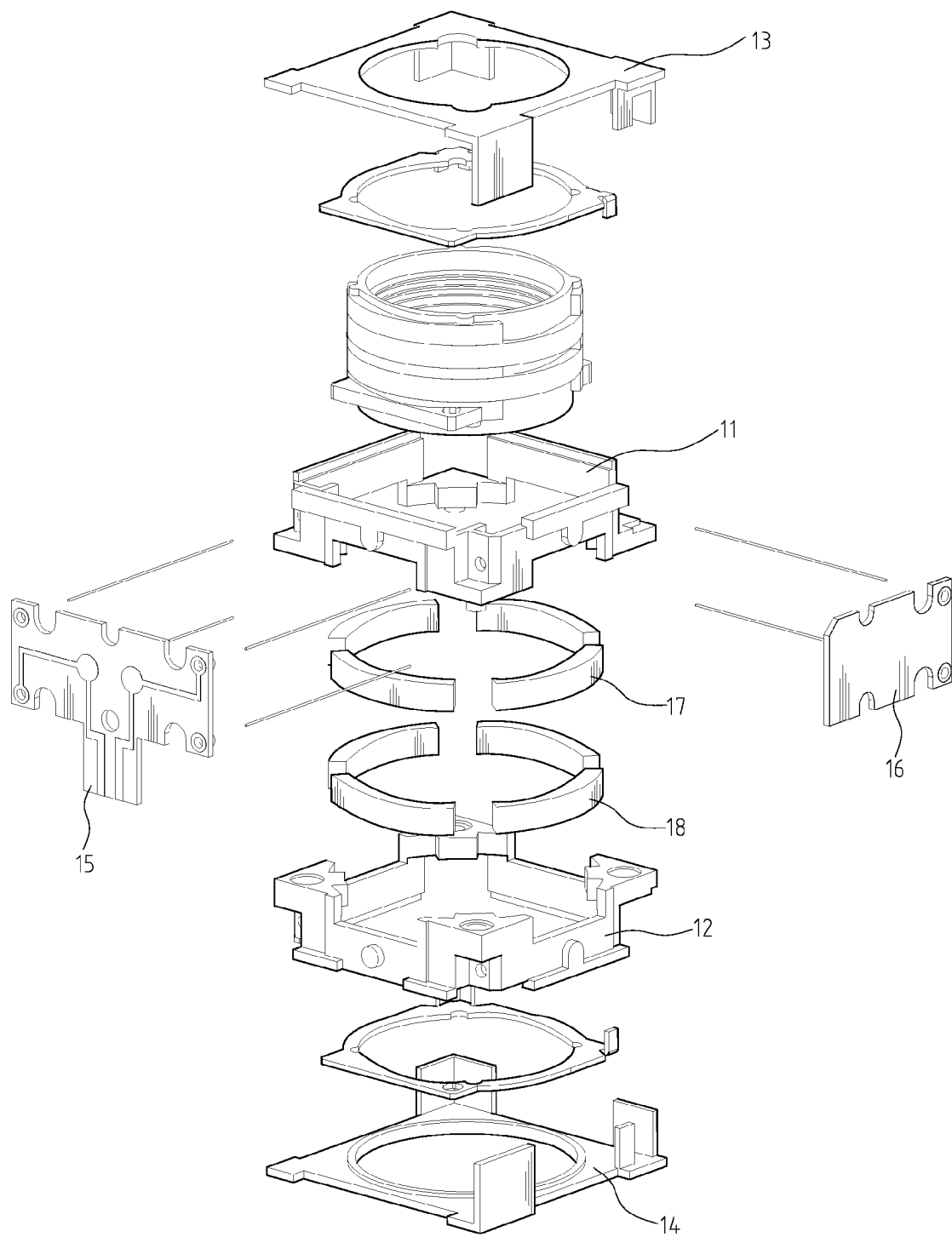
FIG. 3 shows a schematic view of the outer holder and the suspension set of the present invention.

FIG. 3 shows a schematic view of outer holder 1 and suspension set 3. As shown in FIG. 3, outer holder 1 includes an upper holder 11, a lower holder 12, an upper case 13, a lower case 14, a first printed circuit board (PCB) 15 on the outside, a second PCB 16 on the outside, a first magnet set 17 on the inside, and a second magnet set 18 on the inside. Upper holder 11 and lower holder 12 are engaged to each other, with inner circumference having first magnet set 17 and second magnet set 218 attached. Upper case 13 covers the top of upper holder 11, and lower case 14 covers the bottom of lower holder 12. The outside of upper holder 11 and lower holder 12 has first PCB 15 and second PCB 16 attached next to each other. Two metal wires of first metal wire group 31 of suspension set 3 have one end attached to the upper position of first PCB 15, and the remaining metal wire of first metal wire group 31 of suspension set 3 has one end attached to the upper position of second PCB 16. Similarly, two metal wires of second metal wire group 32 of suspension set 3 have one end attached to the lower position of first PCB 15, and the remaining metal wire of second metal wire group 32 of suspension set 3 has one end attached to the lower position of second PCB 16. The attached position of first metal wire group 31, second metal wire group 32, first PCB 15, and second PCB 16 of the embodiment can be changed according to the design requirement.

Figure 4:
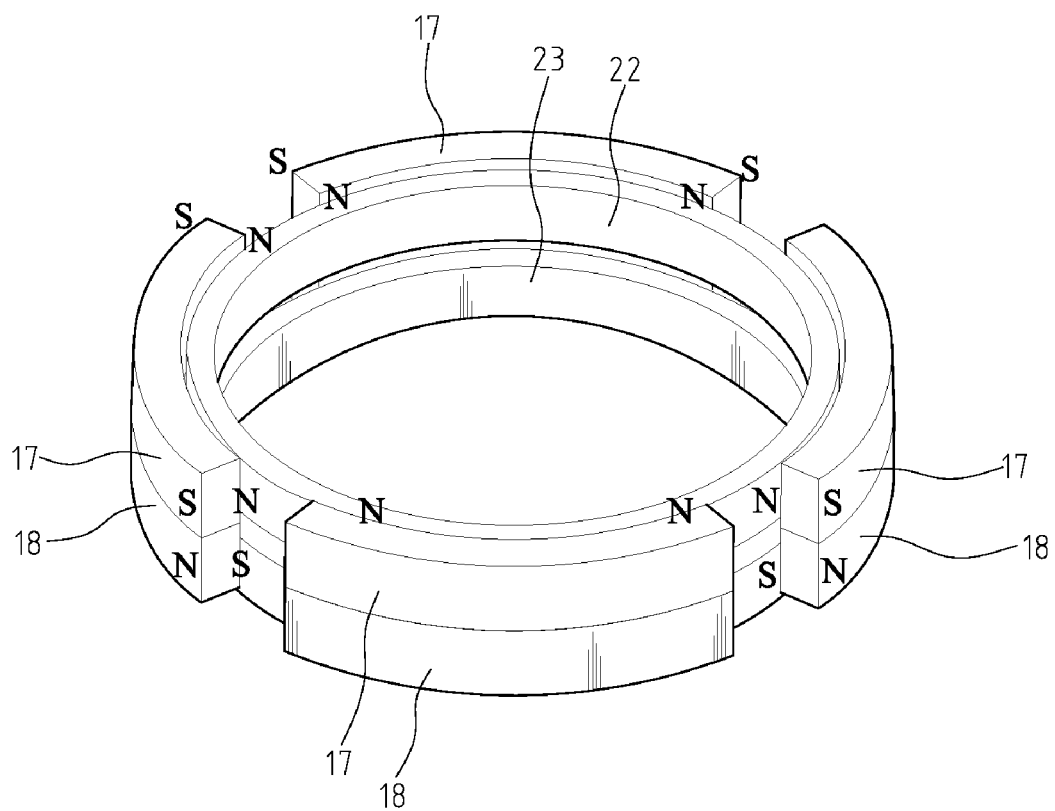
FIG. 4 shows a schematic view of the coils and the magnet sets of the present invention.

FIG. 4 shows a schematic view of coils and magnet sets of the present invention. As shown in FIG. 4, first coil 22 and second coil 23 are arranged in a stack, and the outside of the coils are first magnet set 17 and second magnet set 18, also arranged in a stack. The winding direction of first coil 22 is the opposite of the direction of the second coil 23. The former is counterclockwise, while the latter is clockwise. A crossing wire (now shown) is used to connect the two coils. First magnet set 17 and second magnet set 18 have four permanent magnets each. The N poles of the magnets of first magnet set 17 are facing towards first coil 22, while the S poles are facing outwards. On the other hand, the S poles of second magnet set 18 are facing towards second coil 23, while the N poles are facing outward.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A driving apparatus for fine-tuning focus, comprising:
   an outer holder, further comprising an upper holder, a lower holder, an upper case, a lower case, a first printed circuit board (PCB) on the outside, a second PCB on the outside, a first magnet set on the inside, and a second magnet set on the inside;
   a movable structure, further comprising an inner holder, a first coil, a second coil, an upper spacer, and a lower spacer, said first coil and said second coil being arranged in a stack outside said inner holder, said upper spacer and said lower spacer being fixed to the top and the bottom of said inner holder, said inner holder for holding a lens; and
   a suspension set, further comprising a first metal wire group and a second metal wire group, having at least six metal wires, one end of said first metal wire group and said second metal wire group being fixed to the upper and lower positions of said first PCB and said PCB, the other end of said first metal wire group and said second metal wire group being fixed to said upper spacer and said lower spacer;
   wherein said movable structure being suspended inside said outer holder by said suspension set, a magnet force generated by the interaction of the magnetic field of said first magnet set and said second magnet set of said outer holder, and the electrical current in said first coils and said second coils of said movable structure being able to drive said movable structure upward and downward to adjust the focus.

2. The apparatus as claimed in claim 1, wherein the orientation of the poles of said first magnet set is opposite to the orientation of the poles of said second magnet, and the winding direction of said first coil is different from the direction of said second coil.

3. The apparatus as claimed in claim 1, wherein said first coil and said second coil are connected by a crossing wire.

* * * * *